(12) United States Patent
Criado et al.

(10) Patent No.: US 6,962,119 B2
(45) Date of Patent: Nov. 8, 2005

(54) PROCESS FOR RENDERING AN ASH INERT, ARTIFICIAL POZZOLANA OBTAINED BY MEANS OF THE SAID PROCESS

(75) Inventors: Claude Criado, Dombasle-sur-Meurthe (FR); Fabrice Giraud, Dombasle-sur-Meurthe (FR); Jean-Emmanuel Aubert, Toulouse (FR); Bernard Husson, Auzeville Tolosane (FR)

(73) Assignee: Solvay (Societe Anonyme), Brussels (BE)

( * ) Notice: Subject to any disclaimer, the term of this patent is extended or adjusted under 35 U.S.C. 154(b) by 24 days.

(21) Appl. No.: 10/450,043
(22) PCT Filed: Dec. 12, 2001
(86) PCT No.: PCT/EP01/14983
§ 371 (c)(1), (2), (4) Date: Oct. 29, 2003
(87) PCT Pub. No.: WO02/48066
PCT Pub. Date: Jun. 20, 2002

(65) Prior Publication Data
US 2004/0055519 A1 Mar. 25, 2004

(30) Foreign Application Priority Data
Dec. 13, 2000 (FR) .............................. 00 16453

(51) Int. Cl.$^7$ .................................................. F23B 7/00
(52) U.S. Cl. .................................................... 110/342
(58) Field of Search .......................................... 110/342

(56) References Cited

U.S. PATENT DOCUMENTS

| | | | | |
|---|---|---|---|---|
| 4,877,453 A | * | 10/1989 | Loggers ...................... | 106/710 |
| 5,284,636 A | * | 2/1994 | Goff et al. .................. | 423/235 |
| 5,877,393 A | * | 3/1999 | Webster ...................... | 588/236 |
| 6,132,355 A | * | 10/2000 | Derie .......................... | 588/257 |

* cited by examiner

*Primary Examiner*—Kenneth Rinehart
(74) *Attorney, Agent, or Firm*—Stites & Harbison PLLC; B. Aaron Schulman

(57) ABSTRACT

Process for rendering inert an ash originating from the incineration of municipal waste, according to which the ash is subjected successively to treatment (19) with a water-soluble phosphate (20) in the presence of water, under conditions adjusted to crystallize hydroxyapatite and/or whitlockite, and to calcination (22). Artificial pozzolana, obtained by subjecting an ash originating from the incineration of municipal waste to such an inerting process.

7 Claims, 1 Drawing Sheet

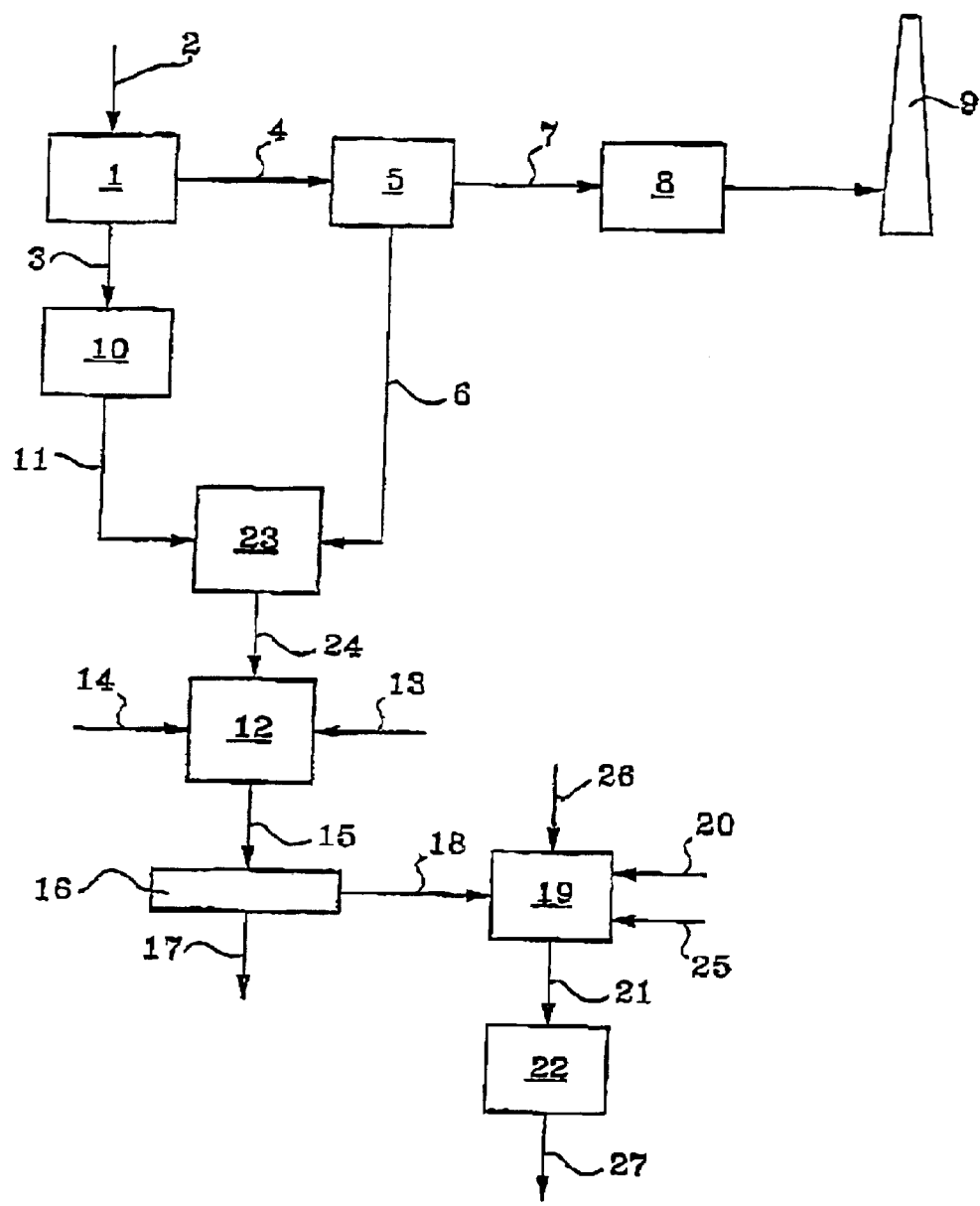

PROCESS FOR RENDERING AN ASH INERT, ARTIFICIAL POZZOLANA OBTAINED BY MEANS OF THE SAID PROCESS

The invention relates to a process for rendering inert ash originating from the incineration of municipal waste.

The incinerators used to destroy municipal waste (domestic waste and hospital waste) produce generally large volumes of ash, both in the form of clinker in the incineration furnaces and of fly ash entrained in the flue gases. The mineralogical composition of this ash does not vary by very much, whatever its origin, and the following are generally encountered therein, although in proportions which can vary by as much as 100%, indeed even more; alkali metal chlorides (NaCl and KCl), calcium (usually in the form of calcium carbonate, calcium sulphate, calcium hydroxide or calcium hydroxychloride, in particular calcium hydroxide and calcium sulphate), quartz, vitrified aluminosilicates, heavy metals in the metallic or combined form (in particular tin, zinc, lead, cadmium, mercury/copper and chromium), chlorinated organic derivatives and nonincinerated materials. The nonincinerated materials usually include aluminium metal.

International Application WO 00/29095 discloses a process for rendering inert waste originating from incinerator flue gases, according to which this waste is dispersed with a hydraulic binder in water and then filtered off.

The process was improved by using, for the filtration stage, a belt filter, which makes it possible to subject the filtration cake to efficient washing. This washing of the cake improves the mechanical properties and the resistance to leaching of the inerted waste resulting from the process.

European Patent EP-883 585 [Solvay (Société Anonyme)] provides a process for rendering inert ash comprising heavy metals. According to this known process, the ash is first washed and filtered, in order to remove the water-soluble materials present therein, and the aqueous cake collected from the filtration is treated with phosphoric acid or an alkali metal phosphate. The phosphate-comprising residue thus obtained is subsequently calcined and then a hydraulic binder and water are added to form a hydraulic mortar. On conclusion of this known process, a solid inorganic mass is obtained which is substantially inert with respect to atmospheric agents and which conforms to the standards for toxicity by leaching, in particular the TCLP (Toxicity Characteristic Leaching Procedure, USA) standard.

These known processes apply to all types of ash, in particular to fly ash originating from the incineration of domestic or hospital waste. They involve a hydraulic binder.

In the case of ash originating from the incineration of municipal waste, an improvement to these known processes has now been found which makes it possible to dispense with the hydraulic mortar without harming the inert nature of the treated ash.

Consequently, the invention relates to a process for rendering inert an ash originating from the incineration of municipal waste, according to which the ash is subjected successively to treatment with a water-soluble phosphate in the presence of water and to calcination; according to the invention, the treatment with the phosphate is carried out under conditions adjusted to crystallize hydroxyapatite and/or whitlockite.

In the process according to the invention, the ash comprises a clinker from a furnace for the incineration of municipal waste and/or a fly ash which was separated from the flue gas originating from such an incineration furnace.

The term "municipal waste" is intended to denote domestic waste and hospital waste. This waste normally comprises metals (including heavy metals and aluminium), calcium-comprising compounds (generally calcium hydroxide and calcium sulphate), sodium-comprising compounds (in particular sodium chloride) and organic compounds (in particular chlorinated organic compounds and items made of plastic, especially made of poly(vinyl chloride)).

The term "heavy metals" is intended to denote metals with a density at least equal to 5 $g/cm^3$, and beryllium, arsenic, selenium and antimony, in accordance with the generally accepted definition (Heavy Metals in Wastewater and Sludge Treatment Processes, Vol. I, CRC Press Inc., 1987, page 2).

The amount of heavy metals in the ash subjected to the process according to the invention depends on the origin of the municipal waste. It is usually between 0.5 and 15 parts by weight per 100 parts by weight of dry matter of the ash, more generally between 3.0 and 10 parts by weight per 100 parts by weight of the ash.

Aluminium is generally present in the ash in an amount of 2.0 to 8.0 parts by weight per 100 parts by weight of the ash, more generally in an amount of 3.0 to 5.0 parts by weight per 100 parts by weight of the ash.

In the process according to the invention, the water-soluble phosphate reacts with the calcium of the ash, forming calcium phosphate. The water-soluble phosphate is generally phosphoric acid or an alkali metal phosphate, for example sodium phosphate. Orthophosphoric acid is preferred.

In accordance with the invention, the treatment with the phosphate is carried out under conditions adjusted in order for the calcium phosphate which is formed to be in the form of crystals of hydroxyapatite and/or of whitlockite.

Hydroxyapatite is a mineral of general formula $Ca_5(PO_4)_3(OH)$. Whitlockite is a mineral of general formula $Ca_9Fe_xMg_{1-x}H(PO_4)_7$, where x is an integer or fractional number between 0 and 1.

The crystals of hydroxyapatite and of whitlockite have the property of allowing, by isomorphism, substitution of a portion of their calcium atoms by atoms of heavy metals. The amount of hydroxyapatite and/or of whitlockite crystallized must consequently be sufficient for these minerals to absorb the heavy metals of the ash in their respective crystal latices. The optimum amount of hydroxyapatite and/or of whitlockite to be crystallized will consequently depend on the amount of heavy metals present in the ash and it must consequently be determined in each specific case by a routine operation in the laboratory. The amount of hydroxyapatite and/or of whitlockite to be crystallized will itself condition the amount of water-soluble phosphate which has to be added to the ash. Depending on the origin of the latter, the amount by weight of water-soluble phosphate employed (expressed in the $H_3PO_4$ form) can vary, for example, from 10 to 20% of the weight of dry matter of the ash. Furthermore, the formation of hydroxyapatite and of whitlockite requires the presence of calcium in the ash. Depending on the amount of hydroxyapatite and/or whitlockite to be crystallized, the amount by weight of calcium (expressed in the CaO form) can vary, for example, from 10 to 35% of the weight of dry matter of the ash. In an alternative form, if required, additional calcium (in the metallic or combined form) has to be added to the ash before or during the addition of the water-soluble phosphate in order to obtain the required amount of crystals of hydroxyapatite and/or of whitlockite. Use is advantageously made of calcium carbonate, preferably avoiding basic calcium compounds, in particular calcium hydroxide.

In the process according to the invention, the water-soluble phosphate is added to the ash in the presence of water. The water must be present in an amount at least sufficient to crystallize the hydroxyapatite and/or the whitlockite. In practice, it is present in an amount of greater than 10% (preferably at least equal to 25%) of the weight of dry matter of the ash. In practice, it is not advantageous for the amount of water employed to exceed 100% of the dry matter of the ash. The values from 30 to 75% are generally highly suitable.

In the process according to the invention, the calcination has a twofold function. First, it serves to destroy the organic compounds of the ash. Secondly, it brings about a recrystallization of the hydroxyapatite and/or of the whitlockite. The calcination is normally carried out at a temperature of greater than 400° C., preferably at least equal to 600° C. It is not advantageous to exceed a temperature of 1000° C. The temperatures from 600 to 950° C. are especially advantageous. The calcination can be carried out in an inert atmosphere (for example, under a nitrogen atmosphere). It is preferable to carry out the calcination in the presence of air, so as to bring about the combustion of the organic compounds, in particular halogenated organic compounds.

The recrystallization of the hydroxyapatite and/or of the whitlockite has the advantageous result of strengthening the insoluble nature of these compounds in water.

In an advantageous embodiment of the process according to the invention, before the treatment of the ash with the phosphate, the ash is subjected to alkaline aqueous washing at a pH of greater than 8.5, for example from 9 to 14, preferably from 9.5 to 13. In this embodiment, the pH is measured on the aqueous solution collected from the washing. This embodiment of the process is targeted at removing the water-soluble compounds of the ash. It exhibits the additional advantage that the ash collected from the washing is found under the optimum conditions for obtaining the crystallization of hydroxyapatite and/or of whitlockite during the treatment with the water-soluble phosphate.

In another specific embodiment of the process according to the invention, which is especially suited to the case of an ash comprising chromium in the hexavalent state, a reducing agent is added to the ash collected from the treatment with the phosphate. In this embodiment of the process, the function of the reducing agent is to reduce the hexavalent chromium in order to bring it to a lower valency state. Iron metal (for example iron filings) and carbon (for example active carbon) constitute preferred reducing agents. The reducing agent is advantageously employed in an amount by weight substantially of between 0.3 and 1% by weight of the ash.

The ash collected from the process according to the invention exists in the form of a pulverulent or granular inorganic mass which is inert with respect to the environment and atmospheric agents and which conforms to the standards for toxicity by leaching, particularly the TLCP standard defined above. This inorganic mass exhibits the noteworthy and unexpected property of having a pozzolanic capability which marks it out for forming hydraulic binders.

In the case where the ash subjected to the process according to the invention comprises calcium sulphate, it may prove to be desirable to decompose the latter. This is because it has been observed that if, on conclusion of the calcination, the ash comprises calcium sulphate, the latter has a detrimental effect on the hydraulic properties of the ash.

To this end, in a specific embodiment of the process according to the invention, the ash is subjected, before or after the calcination, to washing with a solution of sodium carbonate or of sodium hydroxide (for example, at pH 13), so as to dissolve the aluminium by oxidation of the latter. The washing can be carried out at ambient temperature or at a higher temperature, for example from 40 to 75° C.

In an especially advantageous embodiment of the process according to the invention, the ash is washed with an aqueous alkali metal carbonate solution at a pH of greater than 10 to decompose the calcium sulphate. The washing is advantageously carried out at a pH of 12 to 13. In this embodiment of the invention, the pH is measured on the aqueous solution collected from the washing. In the embodiment which has just been described, the washing of the ash with the sodium carbonate solution can be carried out on the ash downstream of the calcination. However, it is preferable, according to an advantageous alternative form of the invention, for the washing with the aqueous sodium carbonate solution to be carried out at the same time as the washing of the ash, upstream of the treatment with the water-soluble phosphate.

It has been observed that in the case where the ash recovered from the calcination comprising aluminium metal, the latter has a detrimental effect on the pozzolanic properties of the ash, resulting in uncontrollable swelling of the mortars.

To this end, in a preferred embodiment of the process according to the invention, the ash is subjected to oxidizing heating in order to oxidize the aluminium metal to alumina. For the implementation of this embodiment of the invention, the oxidizing heating is advantageously carried out at the same time as the calcination, the latter then being carried out in an oxidizing atmosphere (for example, air) at a temperature of greater than 800° C., preferably of 900 to 1000° C.

The ash collected on conclusion of the process according to the invention can be stored in a landfill site without risk to the environment (in particular to ground water and surface water). It can also be recovered in value, such as in civil engineering works, for example in road metals or as filling material in bitumen road surfaces. Because of its pozzolanic properties, the ash collected on conclusion of the process according to the invention finds an especially advantageous use in the manufacture of hydraulic cements.

Consequently, the invention also relates to an artificial pozzolana, obtained by subjecting an ash originating from the incineration of municipal waste to an inerting process in accordance with the invention, and to hydraulic binders comprising this artificial pozzolana.

The invention is illustrated by the following description of the single FIGURE of the appended drawing, which represents the diagram of a plant employing a specific embodiment of the process according to the invention.

The plant represented in the FIGURE comprises a furnace 1 in which municipal waste 2 is incinerated. A clinker 3, on the one hand, and a flue gas 4, on the other hand, are collected from the furnace 1. The flue gas 4 is laden with fly ash and in addition is contaminated by toxic gaseous compounds, particularly hydrogen chloride and volatile heavy metals. It is first treated in a dust separator 5 (for example, an electrostatic precipitator), where the fly ash 6 is separated therefrom. The dedusted flue gas 7 is subsequently treated in a purification device 8, known per se, in order to extract therefrom the acidic gaseous compounds, and then it is discharged to the chimney 9.

The clinker 3 and the fly ash 6 are mainly composed of inorganic compounds and of chlorinated organic compounds, in particular dioxins and furans.

The clinker is treated in a mill 10 and the milled clinker 11 is subsequently introduced with the fly ash 6 into a mixing chamber 23. An ash 24 is collected from the chamber 23 and is sent to a washing chamber 12. The ash 24 is dispersed, in the washing chamber 12, in an amount of water 13 sufficient to dissolve substantially all the water-soluble compounds present in the ash. In addition, sodium carbonate 14, intended to react with the calcium sulphate of the ash to form insoluble calcium carbonate and sodium sulphate, which passes into solution, is introduced into the chamber 12. The pH in the washing medium of the chamber 12 settles at approximately 12.5. An aqueous-suspension 15 is collected from the washing chamber and is treated immediately on a filter 16. An aqueous solution 17, on the one hand, and an aqueous cake 18, on the other hand, are separated from the filter 16.

The cake 18 comprises most of the heavy metals, in addition to the dioxins and the furans, of the ash 24. In addition, it comprises calcium (mainly in the form of calcium hydroxide and calcium carbonate) and is impregnated with water In accordance with the invention, it is introduced into a reaction chamber 19, where orthophosphoric acid 20, extra water 25 and iron filings 26 are added thereto. The phosphoric acid 20 reacts with the calcium compounds and with the water to crystallize hydroxyapatite and/or whitlockite. The function of the iron filings 26 is to reduce the hexavalent chromium. An ash 21 comprising crystals of hydroxyapatite and/or of whitlockite is collected from the reaction chamber 19. It is transferred to a calcination chamber 22, where it is heated at a temperature of approximately 950° C. in the presence of air for a time sufficient to decompose the dioxins and furans, to oxidize the aluminium metal to the form of alumina and to recrystallize the hydroxyapatite and/or the whitlockite. A dry pulverulent mass 27 which is inert and which exhibits the properties of an artificial pozzolana is collected from the calcination chamber 22. The artificial pozzolana 27 can advantageously be used in the manufacture of hydraulic binders.

The examples described below will reveal the advantage of the invention.

In these examples, a fly ash from the incineration of domestic waste was treated, this fly ash having the composition which appears in Table 1 below (analysis carried out by X-ray fluorescence).

TABLE 1

| Constituent | Content (mg/kg) |
|---|---|
| Al | 27 209 |
| Ba | 2 864 |
| Br | 913 |
| Ca | 131 055 |
| Cd | 494 |
| Cl | 170 814 |
| Cr | 636 |
| Cu | 1 430 |
| Fe | 12 688 |
| K | 90 251 |
| Mg | 10 447 |
| Mn | 701 |
| Mo | 576 |
| Na | 11 894 |
| Nb | 10 |
| Ni | 101 |
| P | 3 246 |
| Pb | 11 226 |
| Rb | 121 |
| S | 50 698 |
| Sb | 1 020 |
| Si | 44 950 |
| Sn | 1 502 |
| Sr | 516 |
| Ti | 8 224 |
| V | 107 |
| Zn | 18 123 |

EXAMPLE 1

100 g of ash were withdrawn and were subjected to a washing operation. To this end, the ash was dispersed in an aqueous solution composed of 1 l of demineralized water comprising 50 g of sodium carbonate and the aqueous suspension thus obtained was subjected to moderate stirring for 2 hours at ambient temperature.

The aqueous suspension was subsequently filtered, the filtration cake was dried and the dry cake was weighed: 78.2 g.

70 g of the dry cake were withdrawn and were subjected to the inerting process. To this end, 70 g of water and 7 g of phosphoric acid (which corresponds to 0.1 kg of phosphoric acid per kg of dry cake) were successively added to it and the resulting mixture was calcined at 750° C. for 1 hour. The dry powder collected on conclusion of the calcination was subjected to a standardized test of toxicity by leaching. To carry out this test, 30 g of the powder were withdrawn and were subjected to three successive leachings with 300 ml of demineralized water. The three leaching solutions were collected and mixed and the composition of the mixture of the leaching solutions which is thus obtained was analysed. The result of the analysis appears in Table 2 below.

TABLE 2

| Constituents | Contents (mg/kg of solution) |
|---|---|
| Al | 9.5 |
| As | 0.024 |
| Ba | 0.2 |
| Ca | 5.5 |
| Cd | <0.01 |
| Co | <0.04 |
| Cr | 0.42 |
| Cr (VI) | <0.2 |
| Cu | 0.01 |
| Fe | <0.02 |
| Hg | 0.03 |
| Mg | 0.3 |
| Mn | <0.01 |
| Mo | 0.84 |
| Ni | <0.03 |
| Pb | <0.3 |
| Sb | 0.17 |
| Sn | <0.02 |
| Sr | 0.2 |
| Ti | <0.01 |
| Tl | 0.3 |
| V | <0.03 |
| Zn | 0.05 |

EXAMPLE 2

The test of Example 1 is repeated under the following conditions:

| | |
|---|---|
| Washing solution: | 1 l of demineralized water, as such, without sodium carbonate, |
| Phosphoric acid: | 4.5 g (which corresponds to 0.1 kg/kg of dry cake), |
| Calcination: | 750° C. for 1 hour. |

The results of the test of toxicity by leaching are recorded in Table 3 below.

TABLE 3

| Constituents | Contents (mg/kg of solution) |
|---|---|
| Al | 16 |
| As | <0.01 |
| Ba | 0.2 |
| Ca | 778 |
| Cd | <0.01 |
| Co | <0.03 |
| Cr | 2.4 |
| Cr (VI) | 0.65 |
| Cu | 0.02 |
| Fe | <0.01 |
| Hg | 0.005 |
| Mg | 2.5 |
| Mn | <0.001 |
| Mo | 2.8 |
| Ni | <0.03 |
| Pb | <0.50 |
| Sb | 0.01 |
| Sn | <0.05 |
| Sr | 3.9 |
| Ti | <0.02 |
| Tl | <0.50 |
| V | <0.03 |
| Zn | |

EXAMPLE 3

In order to demonstrate the pozzolanic nature of the treated ash, the following comparative test was carried out. 75 g of road hydraulic binder "ARC 3" (composed of 78% slag, 11% quicklime and 5% clinker) were mixed with 25 g of ash treated according to the invention. The resulting mixture was mixed with water and subjected to setting and curing. The mechanical properties of the mortar obtained were measured according to the EN 196-1 standard and were compared with the properties of a mortar obtained starting from 100% of road hydraulic binder "ARC 3".

| | Term (days) | Flexural strength (MPa) | Compressive strength (MPa) |
|---|---|---|---|
| 100% Road binder "ARC 3" | 60 d | 7.4 | 32.0 |
| 75% Road binder "ARC 3" + 25% treated ash | 60 d | 7.3 | 33.2 |

The substitution of 25% of binder by treated ash does not reduce the mechanical properties of the mortar, which shows the pozzolanic nature of the treated ash.

The preceding examples show the good ability of the process according to the invention to render inert the heavy metals of fly ash.

Comparison of the results of Example 1 with those of Example 2 reveals in addition the advantage of incorporating sodium carbonate in the water used to wash the fly ash, as regards rendering inert toxic metals, in particular chromium (especially chromium(VI)), aluminium, molybdenum and strontium.

What is claimed is:

1. Process for rendering inert an ash originating from the incineration of municipal waste, according to which the ash is subjected successively to treatment with a water-soluble phosphate in the presence of water and to calcination, characterized in that the treatment with the phosphate is carried out under conditions adjusted to crystallize hydroxyapatite and/or whitlockite, characterized in that a reducing agent is added to the ash.

2. Process according to claim 1, characterized in that, before the treatment with the phosphate, the ash is subjected to alkaline washing at pH of greater than 8.5.

3. Process according to claim 2, characterized in that the washing is carried out at a pH of 9.5 to 13.

4. Process for rendering inert an ash originating from the incineration of municipal waste, according to which the ash is subjected successively to treatment with a water-soluble phosphate in the presence of water and to calcination. characterized in that the treatment with the phosphate is carried out under conditions adjusted to crystallize hydroxyapatite and/or whitlockite, characterized in that, in the case where the ash comprised calcium sulphate, it is washed with an aqueous alkali metal carbonate solution at a pH of greater than 10.

5. Process according claim 4, characterized in that the washing of the ash with the alkali metal carbonate solution is carried out at a pH of 12 to 13.

6. Process for rendering inert an ash originating from the incineration of municipal waste, according to which the ash is subjected successively to treatment with a water-soluble phosphate in the presence of water and to calcination, characterized in that the treatment with the phosphate is carried out under conditions adjusted to crystallize hydroxyapatite and/or whitlockite, characterized in that in the case where the ash comprises aluminum metal, it is subjected to a treatment for oxidation of the said aluminum metal, and the treatment of oxidation of the aluminum metal comprises an oxidizing heating of the ash.

7. Process according to claim 6, characterized in that, to carry out the oxidizing heating of the ash, the calcination is carried out at a temperature of 900 to 1000° C.

* * * * *